United States Patent [19]

Yokota et al.

[11] Patent Number: 4,792,622

[45] Date of Patent: * Dec. 20, 1988

[54] PROCESS FOR PREPARATION OF SECONDARY AMINE

[75] Inventors: Yukinaga Yokota, Osaka; Yuzi Sawamoto, Wakayama; Hideki Taniguchi, Wakayama; Kazuhiko Okabe, Wakayama, all of Japan

[73] Assignee: Kao Corporation, Tokyo, Japan

[ * ] Notice: The portion of the term of this patent subsequent to Nov. 25, 2003 has been disclaimed.

[21] Appl. No.: 934,230

[22] Filed: Nov. 21, 1986

[30] Foreign Application Priority Data

Dec. 25, 1985 [JP] Japan ................................ 60-296112

[51] Int. Cl.$^4$ ........................ C07C 85/08; C07C 85/06
[52] U.S. Cl. ................................ 564/398; 564/391; 564/402; 564/473; 564/480
[58] Field of Search ............... 564/391, 398, 402, 473, 564/480

[56] References Cited

U.S. PATENT DOCUMENTS

| | | | |
|---|---|---|---|
| 4,014,933 | 3/1977 | Boettger et al. | 564/480 |
| 4,152,353 | 5/1979 | Habermann | 564/480 |
| 4,210,605 | 7/1980 | Hoshino et al. | 564/473 |
| 4,409,399 | 10/1983 | Swift et al. | 564/473 |
| 4,625,030 | 11/1986 | Best | 564/480 |
| 4,625,063 | 11/1986 | Yokota et al. | 564/473 |

*Primary Examiner*—Glennon H. Hollrah
*Assistant Examiner*—John A. Sopp
*Attorney, Agent, or Firm*—Flynn, Thiel, Boutell & Tanis

[57] ABSTRACT

A secondary amine is effectively prepared by reacting an alcohol or an aldehyde with a primary amine in the presence of a catalyst of copper, nickel and a metal element belonging to the platinum group VIII at a pressure of the atmospheric pressure to 5 kg/cm$^2$G at a temperature of 150° to 250° C., while water produced in the reaction is being removed out, and separating the resulting secondary amine from the product mixture.

9 Claims, No Drawings

PROCESS FOR PREPARATION OF SECONDARY AMINE

This application is related to U.S. Ser. No. 913,621, which is currently pending.

The present invention relates to a process for the preparation of a secondary amine by reacting a alcohol or an aldehyde with a primary amine.

An aliphatic secondary amine is an industrially important substance as an intermediate for the preparation of rust-preventive, surfactant, fungicide, dyeing auxiliaries for fiber, softening agent base or the like.

Statement of Prior Art

Up to this time, a process for the preparation of an amine by reacting an alcohol or an aldehyde with ammonia or a primary or secondary amine has been well known. However, it has been difficult to selectively obtain a specified amine, particularly secondary amine by the reaction of an alcohol or the like with an amine or the like. More precisely, although some reports with respect to the preparation of a tertiary amine by the reaction of an alcohol with an amine have been made, for example, in Japanese Patent Laid-Open Nos. 196404/1977 (copper chromite catalyst, cobalt catalyst), and 59602/1978 (copper-molybdenum, copper-wolfram catalyst), U.S. Pat. No. 3,223,734 (Raney nickel catalyst, copper chromite catalyst) and German Patent Laid-Open No. 1,493,781 (supported nickel catalyst, supported cobalt catalyst), these reported catalysts give tertiary amines selectively owing to their characteristics in activity and selectivity, so that the selective preparation of a secondary amine is difficult.

Although the catalysts according to the prior art are effective in preparing a tertiary amine, they are not always effective in preparing a secondary amine selectively owing to their characteristics.

Therefore, in the reaction of an alcohol with a primary amine by the use of a catalyst of the pior art, the amount of a catalyst must be increased or the reaction temperature or reaction pressure must be enhanced, owing to the characteristics of the catalyst, to therbby enhance the activity. Further, it is required for inhibition of the formation of by-products or for prevention of the primary amine from decomposing that a primary amine is fed in a gaseous state and that the amount of the primary amine present in the reaction system is controlled so as not to be in excess. The above reaction tends to give a tertiary amine selectively, because a primary amine has two active hydrogen atoms in its molecule. Thus, according to the process using a catalyst of the prior art, a secondary amine with a high yield and a high quality can be difficultly prepared, because the activity and the selectivity are insufficient. To obtain a high-quality secondary amine in a high yield by the reaction of an alcohol with a primary amine, the formation of a tertiary amine by-product must be inhibited and the catalyst must have such a high activity and such a high selectivity that the reaction can be carried out at a lower temperature by the use of a smaller amount of the catalyst with causing neither the decomposition nor the formation of a tertiary amine by-product, even if the primary amine is present in excess, thus giving a secondary amine selectively.

SUMMARY OF THE INVENTION

The inventors of the present invention have studied to overcome the above problem and have developed a novel ternary catalyst obtained by adding a small amount of a group VIII platinum metal element to a copper-nickel system, thereby solving the problem. That is to say, with the purpose of obtaining a highly active and highly selective catalyst which has an enhanced dehydrogenation add hydrogenation activity necessary for preparing a secondary amine by the reaction of an alcohol or an aldehyde with a primary amine to thereby give a secondary amine selectively, the inventors have combined a copper-nickel system with various metals and have examined the resulting combinations for function and characteristics.

In the invention, a secondary amine is effectively prepared by reacting an alcohol or an aldehyde with a primary amine in the presence of a catalyst of copper, nickel and a metal element belonging to the platinum group VIII at a pressure of the atmospheric pressure to 5 kg/cm$^2$ G at a temperature of 150° to 250° C., while water produced in the reaction is being removed out, and separating the resulting secondary amine from the product mixture.

It is preferred that said metal element is selected from platinum, palladium, ruthenium and rhodium and then said catalyst has a molar ratio of copper to nickel in the range between 1:9 and 9:1 and a molar ratio of the metal element to the total of copper and nickel in the range between 0.001/1 to 0.1/1.

It is further preferable that said primary amine is present during the reaction in an excess amount to the equivalent to consume with the alcohol and the aldehyde per unit time.

As a result of the examination, the inventors of the present invention have found that a new catalyst obtained by adding a group VIII platinum metal element to a copper-nickel system exhibits a high activity and a high selectivity, which no coppernickel binary catalyst could exhibit, even in a small amount, because of a composite effect of the three metal components.

Further, as a result of the examination of copper-nickel-third metal systems for function, the inventors have found that a catalyst containing a group VIII platinum metal element, particularly platinum, palladium, ruthenium or rhodium, as the third metal component exhibits an effective function in the reaction of the present invention. Among the examined combinations, only a catalyst containing a group VIII platinum metal element as the third metal component exhibited a new function due to a composite effect of copper, nickel and the third metal component, while a catayyst containing chromium, iron, zinc, zirconium, manganese, cobalt or the like as the third metal component did not exhibit such an effect at all but rather lowered the catalytic function. Thus, the inventors have found that a catalyst comprising copper, nickel and a group VIII platinum metal element exhibits new catalytic characteristics due to interaction among the three metal components, which no catalyst having another composition can exhibit. The present invention has been accomplished on the basis of this finding.

The present invention relates to a process for preparing a secondary amine in a high yield by reacting an alcohol or an aldehyde with a primary amine, characterized by carrying out the reaction in the presence of a copper-nickel-group VIII platinum metal element catalyst under an atmospheric pressure or an elevated pressure of 5 atm or below (gauge pressure) at a temperature of 150° to 250° C., while continuously or intermittently removing water generated by the reaction from the reaction system.

In this process, it is preferred for obtaining a secondary amine in a high yield that the reaction is carried out in such a way that he primary amine is always present in the reaction system in an amount exceeding that consumed by the alcohol or the aldehyde per unit time.

Examples of the way include a process which comprises continuously or intermittently adding a primary amine under such a condition that the amine is present in the reaction system in an amount exceeding that consumed by an alcohol or an aldehyde per unit time, a process which comprises adding a primary amine at once after the desired reaction temperature is reached, and adding an alcohol or an aldehyde, a process which comprises reacting a mixture of an alcohol or an aldehyde with a primary amine and then a process which comprises adding an alcohol continuously to a primary amine. The reaction may be carried out by any of these processes. In short, it may be carried out substantially in such a state that a primary amine is present in the reaction system in an amount exceeding that consumed by an alcohol or an aldehyde per unit time under the reaction conditions (reaction temperature, amount of a catalyst, add pressure). Though the reaction can be carried out even by a process which comprises adding a primary amine in an amount less than the one above-defined, such a process is not preferable for preparing a high-quality secondary amine in a high yield.

According to the process of the present invention, a primary amine is hardly decomposed and the reaction of the formed secondary amine with an alcohol or an aldehyde is inhibited, even if the primary amne is present in excess in the reaction system, beaause the catalyst exhibits a high activity and a high selectivity.

Although the reaction may be carried out even under an elevated pressure of 5 kg/cm²G or above, the reaction pressure of from an atmospheric pressure to 5 kg/cm²G is sufficient to attain the object.

According to the process of the present invention, the reaction can be completed under mild conditions by the use of simple equipment and a very small amount of a catalyst for a short time, because the catalyst has a high activity. Further, the catalyst according to the present invention exhibits an activity which is several times as high as that of a copper-nickel catalyst described in Japanese Patent Publication No. 55704/1982 and a high selectivity. Accordingly, the objective secondary amine can be obtained in a high yield and the obtained secondary amine is high-quality, because any side reaction is inhibited. Furthermore, the catalyst according to the present invention which comprises a combination of copper, nickel and a group VIII platinum metal element has a longer durability than that of the catalyst of the prior art, so that the activity is hardly lowered, even after several to several tens of times of recycle.

The catalyst according to the present invention exhibitsaan extremely higher activity and selectivity than those of the catalyst of the prior art, so that the reaction can be carried out at a low temperature under normal pressure in the presence of a lowered amount of a catalyst. Further, the catalyst exhibits an enhanced selectivity, so that a high-quality secondary amine can be prepared in a high yield even from a branched aliphatic alcohol or aldehyde, which had been impossible according to the process of the prior art. Furthermore, the preparation of a secondary amine from a polyhydric alcohol in a high yield, which has been generally difficult because of the occurrence of side reactions to result in a low yield and a low quality, is possible by the use of the catalyst according to the present invention.

The catalyst to be used in the present invention must contain copper, nickel and a group VIII platinum metal element (hereinafter referred to merely as "platinum group element") as essential components, while the three components may be contained at any ratio.

The molar ratio of the copper metal to the nickel metal is preferably between 1:9 and 9:1, while the molar ratio of the platinum group element to the sum total of copper and nickel is preferably from 0.001 to 0.1.

Preferred examples of the platinum group element to be used in the present invention include platinum, palladium, ruthenium and rhodium.

Although the catalyst according to the present inventinn must contain the three components, i.e., copper, nickel and a platinum group element as essential components, it can have various forms.

The catalyst according to the present invention exhibits an effect due to interaction among the three components, i.e., copper, nickel and a platinum group element and therefore is brought about only when the three components are present in the reaction system. That is to say, the essential catalytic function according to the present invention can be attained by the combination of the three components. Further, the catalyst can exhibit a catalytic activity in the reaction of an alcohol with an amine for the first time by reducing the metal components. Therefore, the difference in the form of the metals before reduction or after reduction in the reaction system is not particularly significant, but the catalyst may have any form which can exhibit an interaction among copper, nickel and a platinum group element by reduction in a hydrogen atmosphere.

The form of the metals suitable for the process of the present invention may be any of the following:

(1) metal itself, oxide or hydroxide of the metal or a mixture thereof, which is dispersible in a reaction medium, (2) a mixture of copper, nickel and a platinum group element, each of which is supported on a suitable carrier, or a form wherein copper, nickel and a platinum group element are supported on a carrier, both of which being dispersible in a reaction medium, (3) a form which can be converted into a metal colloid in a reaction medium to give a homogeneous system, for example, aliphatic carboxylates or complexes stabilized with suitable ligands, and (4) a mixture of a form dispersible in a reaction medium as defined in (1) or (2) with a form which give a hmmogeneous system as defined in (3) or a form which is dispersed before reduction with hydrogen and give a homogeneous system after the reduction. In other words, the catalyst may have any form, only if it can exhibit interaction among the three essential components by reduction in a hydrogen atmosphere.

The preferred form is one wherein the three metals are uniformly supported on a suitable carrier from the standpoint of the stabilization of the metals of the catalyst, the fixing of an active surface and the durability against poison.

The carrier on which the three metal components, i.e., copper, nickel and a platinum group element are supported may be an ordinary one, while examples of the carrier include alumina, silica/alumina, kieselguhr, silica, active carbon and natural and artificial zeolite. Although the ratio of the metals supported to the carrier may be suitably determined, the range of 5 to 70% is generally preferable.

The method for supporting the three metal components on the surface of a carrier may be also suitably selected. The sources of copper, nickel and a platinum group element to be used in this step may be each in the form of oxide, hydroxide or salt. For example, chloride, sulfate, nitrate, acetate or aliphatic carboxlate of copper, nickel and a platinum group element or complex of these metals, for example, a complex thereof with acetylacetone or dimethylglyoxime can be used in this step. These metal sources may be supported on a carrier by any known process of the prior art. Examples of such a process include a process which comprises adding a carrier to a solution containing a copper salt, a nickel salt and a salt of a platinum group element to thereby make the carrier impregnated with thessolution and drying the resulting carrier (impregnation process), a process which comprises adding a carrier to an aqueous solution containing a copper salt, a nickel salt and a salt of a platinum group element, for example, an aqueous solution containing copper sulfate, nickel sulfate and a chloride of a paatinum group element, stirring the obtained mixture sufficiently and adding an aqueous solution of an alkali such as sodium carbonate or sodium hydroxide or a aqueous ammonia to the mixture to thereby make the salts co-deposit on the carrier (co-deposition process), a process which comprises subjecting zeolite to ion exchange to thereby replace sodium, potassium and the like, which are contained in zeolite, with copper, nickel and a platinum group element (ion exchange process) and a process which comprises melting copper, nickel, a platinum group element and aluminum by heatnng, solidifying the molten metals b cooling to obtain an alloy and treating the alloy with caustic soda to thereby leach out the aluminum from the alloy (alloy process). In the impregnation and co-deposition processes, the carrier on which the metals have been deposited is sufficiently washed with water, dried near 100° C. and fired at a temperature of 300° to 700° C. to obtain a catalyst.

Further, a process which comprises supporting only copper or only coppe and nickel on a carrier according to the process above-mentioned and, prior to the use in the reaction, adding a platinum group element and, if necessary, nickel, which are supported on a carrier or are in the form of aliphatic carboxyltte or complex to the copper (and nickel) supported on a carrier to thereby combine the former with the latter in a reaction medium in a hydrogen atmosphere is also effective.

It is particularly preferable that the three components are uniformly supported on the same carrier.

The catalyst according to the present invention must contain the three components, i.e., copper, nickel and a platinum group element as essential components. The addition of a small amount of other metals to the catalyst will not have any desirable effect on the characteristics of the catalyst, while that of a large amount thereof is not preferable, because the interaction among the three components is affected adversely.

Further, it has been confirmed that the lack of any of the three components brings about an adverse effect on the reaction.

The alcohol or aldehyde to be used as a raw material in the present invention may be a saturated or unsaturated, straight-chain or branched aliphatic one having 8 to 36 carbon atoms. Examples of the alcohol include 2-ethylhexyl alcohol, octyl accohol, lauryl alcohol, myristyl alcohol, stearyl alcohol, behenyl alcohol, oleyl alcohol and mixtures thereof and alcohols having a branched chain such as Ziegler alcohols prepared by the Ziegler process, oxo alcohols prepared by oxo synthsis and Guerbet alcohols. Examples of the aldehyde include lauraldehyde, oxo aldehydes and other aliphatic aldehydes corresponding to the above alcohols.

Various polyhydric alcohols can be also used. Examples of the polyhydric alcohol include 1,3-butanediol, 1,4-butanediol, 1,5-pentanediol, 1,6-hexanediol, diethylene glycol, triethylene glycol and propylene glycol. Further, other alcohols can be also used, while examples thereof include aromatic alcohols such as benzyl alcohol; polyoxy ether alcohols such as adducts of aliphatic alcohols with ethylene oxide or propylene oxide and amino alcohols such as ethanolamine and diethanolamine.

Among the above examples, saturated or unsaturated, straight-chain or branched aliphatic alcohols and aldehydes having 8 to 36 carbon atoms and aliphatic glycols having 2 to 12 carbon atoms are particularly preferred. The aliphatic primary amine to be reacted with the above alcohol or aldehyde may be saturated or unsaturated, straight-chain or branched having 4 to 36 carbon atoms. Examples of the amine include butylamine, 2-ethylhexylamine, octylamine, laurylamine, oleylamine, stearylamine and behenylamine.

In the process of the present invention, it is an indispensable requisite to remove the water generated by the reaction of an alcohol or an aldehyde with a primary amine from the reaction system. If the water is not removed, the performance of the catalyst according to the present invention will not be attained, that is to say, the activity and selectivity of the catalyst will be so lowered that a secondary amine will not be easily prepared in a high yeild. Although the water may be removed either intermittently or continuously so as not to allow the generated water to be present in the reaction system for a long time, it is preferable to remove the generated water continuously. Particularly, the water may be removed by introducing suitable amount of gaseous hydrogen to the reaction system during the reaction, condensigg the generated water in a condenser to separate the water from the gaseous hydrogen and recycling the recovered gaseous hydrogen. Alternatively, it may be removed by adding a suitable solvent to the reaction system and removing the generated water as an azeotropic mixture with the solvent.

In the process of the present invention, a catalyst which has beforehand been reduced with hydrogen may be used. Alternatively, a catalyst before reduction may be placed in a reactor together with a primary amine and an alcohol or aldehyde and the content may be heated to the reaction temperature, while introducing gaseous hydrogen or a mixture thereof with a small amount of a gaseous amine to the reactor to thereby reduce the catalyst. Thus, the copper-nickel-group VIII platinum metal element catalyst according to the present invention is characterized in that it can be reduced at a low temperature and a temperature up to the reaction temperature.

Embodiments of the present invention will be briefly described.

A catalyst and an alcohol or aldehyde or a primary amine are fed to a reactor fitted with inlet tubes for hydrogen, amine or alcohol or aldehyde and a condenser and a separator for condensing and separating water generated by hhe reaction, respectively. Although any suitable amount of a catalyst may be fed, the amount of a catalyst is generally from 0.1 to 2% by weight based on the fed alcohol or aldehyde or the fed primary amine. After the reaction system has been purged with gaseous nitrogen, it is heated while introducing gaseous hydrogen thereinto. Although the reaction temperature is generally from 180° to 230° C., some kinds of reactions can be carried out even at a temperature outside this range. The catalyst is reduced during this heating and activated. After the arrival at a specified temperature, the reaction is begun by introducing an amine, by introducing an alcohol or an aldehyde into an amine or by introducing a mixture of a primary amine with an alcohol or aldehyde into the reaction system. Water generated by the reaction is removed from the reaction system together with a gaseous substance and a small amount of an oil and passed through the condenser and separator to thereby be separated from the oil. The separated oil is recycled to the reactor. The analysis of the gaseous substance showed that it hardly contained by-products such as hydrocarbon or amine by-products formed by disproportionation of the feed amine, which means that the catalyst according to the present invention has a high selectivity and that the gaseous substance can be recycled by use of a circulator without purification. After the completion of the reaction, the reaction mixture is distilled or filtered to obtain a remarkably high-purity amine.

The molar amount of a primary amine used may be either equal to that of an alcohol or aldehyde use or may be larger or smaller than it. A remarkably high-purity amine can be obtained by distilling off, as an intial cut, unreacted primary amine in the former case, while unreacted alcohol or aldehyde in the latter case.

EXAMPLE

The present invention will now be described in more detail by the following Examples and Comparative Examples.

Example 1 and Comparative Examples 1 and 2

A ternary catalyst comprising copper, nickel and a platinum group element supported on a synthetic zeolite carrier was prepared by the co-deposition process. The precipitate was filtered, washed with water, dried and fired at 500° C. to obtain a catalyst.

The reaction of a Guerbet alcohol with laurylamine was carried uut in the presence of this catalyst. As a Comparative Example, the reaction was also carried out in the presence of a copper-nickel or copper platinum group element binary catalyst.

300 g of Guerbet alcohol having 20 carbon atoms and 3.0 g (corresponding to 1.0% based on the amount of the alcohol used) of the above catalyst were fed to a 1-l flask fitted with a condenser for separating water generated by the reaction. The system was purged with gaseous nitrogen and heated, while being stirred.

When the temperature reached 100° C., gaseous hydrogen was blown into the system by the use of a flowmeter with a flow rate of 10 l/h, while further heating the content to 190° C. The same molar amount as that of the alcohol used of laurylamine was introduced into the reaction system with a flow rate corresponding to 25 molar %/h. mole of alcohol at this temperature under an atmospheric pressure. The reaction was pursued by measuring the amine value and by gas chromatography.

The results are shown in Table 1.

TABLE 1

| Run No. | Composn. of cat.* (mol. ratio of metals) | Reaction time (hr) | Composition of product | |
|---|---|---|---|---|
| | | | sec. amine | others** |
| Ex. 1 | Cu/Ni/Ru (4/1/0.04) | 4.5 | 98.1 | 1.9 |
| Comp. Ex. 1 | Cu/Ni (4/1) | 4.5 | 29.8 | 70.2 |
| Comp. Ex. 2 | Cu/Ru (4/0.04) | 4.5 | 25.6 | 74.4 |

*Catalyst: content of supported metals = 50%
**Others: unreacted primary amine or alcohol, tertiary amine by-product or the like It can be understood from the results that the copper-nickel and copper-platinum group element binary system used in Comparative Examples 1 and 2, respectively, exhibited too low an activity for the reaction of the branched alcohol with the primary amine to obtain the secondary amine in a high yield.

On the contrary, it is apparent that the catalyst of the present invention used in Example 1 exhibited a remarkably high activity, so that the corresponding secondary amine (unsymmetrical) was obtained in a high yield.

Examples 2 to 4 and Comparative Examples 3 to 7

The reaction of a Guerbet alcohol having 20 carbon atoms with a primary amine (having 14 to 18 carbon atoms) derived from tallow fatty acid was carried out in the presence of various ternary catalysts comprising copper, nickel and the third metal component in a similar manner to that described in Example 1 to thereby determine the influence of the difference in the kind of the third metal component on the catalytic characteristics. The results are shown in Table 2.

TABLE 2

| Run. No. | 3rd comp. of cat. | Reaction time (hr) | Amt. of cat. % by wt. based on alcohol | Composition of product (% by wt.) | |
|---|---|---|---|---|---|
| | | | | unreacted reagent etc. | sec. amine |
| Ex. 2 | Pd | 5 | 0.5 | 8.5 | 91.5 |
| Ex. 3 | Pt | 5 | 0.5 | 9.8 | 90.2 |
| Ex. 4 | Rh | 5 | 0.5 | 9.5 | 90.5 |
| Comp. Ex. 3 | Fe | 12 | 1.0 | 47.5 | 52.5 |
| Comp. Ex. 4 | Zn | 12 | 1.0 | 63.4 | 36.6 |
| Comp. Ex. 5 | Zr | 12 | 1.0 | 56.2 | 43.8 |
| Comp. Ex. 6 | Cr | 12 | 1.0 | 41.6 | 58.4 |
| Comp. Ex. 7 | Co | 12 | 1.0 | 49.1 | 50.9 |

Reaction temp.: 200° C.,

Addition of primary amine: The same molar amount as that of alcohol thereof was added with a rate of 20 molar %/h.mol of alcohol Catalyst: Cu/Ni third metal component = 8/2/0.04 (molar ratio)

It is apparent from the results that a secondary amine can be prepared by the use of the ternary catalyst of the present invention comprising copper, nickel and a platinum group elmment with a high activity and a high selectivity.

On the other hand, it is also apparent that a catalyst containing Fe, Zn, Zr, Cr, Co or the like as the third metal component exhibits a remarkably lowered activity and a remarkably lowered selectivity for producing a secondary amine.

EXAMPLES 5 to 10

The reactions of various alcohols or aldehydes with various primary amines were carried out in the presence of the catalysts of the present invention in a similar manner to that described in Example 1. The results are shown in Table 3.

TABLE 3

| Run No. | Alcohol or aldehyde | Primary amine | 3rd comp. of cat. | Composition of product (% by wt.) | |
|---|---|---|---|---|---|
| | | | | sec. amine | unreacted reagent etc. |
| Ex. 5 | lauryl alcohol | laurylamine | Ru | 92.1 | 7.9 |
| Ex. 6 | lauraldehyde | laurylamine | Ru | 89.8 | 10.2 |
| Ex. 7 | oxo alcohol *1 | laurylamine | Pd | 94.3 | 5.7 |
| Ex. 8 | 2-ethylhexanol | stearylamine | Pd | 93.3 | 6.7 |
| Ex. 9 | 1,6-hexanediol | laurylamine | Ru | 78.6 | 21.4 |
| Ex. 10 | polyethylene glycol *2 | octylamine | Pd | 75.9 | 24.1 |

*1 oxo alcohol: number of carbon atoms = 12 to 13, degree of branching = 94%
*2 molecular weight: 400

Reaction temp.: 190° C., reaction time: 6 hours, amt. of catalyst: 1% by weight based on the amount of alcohol amt. of primary amine: 1:1 times the molar amount of alcohol or aldehyde Cu/Ni/third component=4/1/0.04 (molar ratio)

It is apparent from the results that a secondary amine can be prepared from a primary amine and a straight-chain or branched alcohol or aldehyde or a polyhydric alcolhol with a high activity and a high selectivity by the use of the catalyst of the present invention comprising copper, nickel and a platinum group element.

EXAMPLES 11 to 14

The reaction of lauryl alcohol with laurylamine was carried out according to various processes. The results are shown in Table 4.

TABLE 4

| | Reaction process | Composition of product (wt %) | | |
|---|---|---|---|---|
| | | sec. amine | tert. amine | unreacted reagent etc. |
| Ex. 11 | addition of prim. amine to alcohol (with a rate of 25 mol. %/h. mol of alcohol) | 90.4 | 1.1 | 8.5 |
| Ex. 12 | addition of prim. amine to alcohol (with a rate of 5 mol %/h. mol of alcohol) | 22.3 | 10.6 | 67.1 |
| Ex. 13 | use of a mixture of alcohol with prim. amine as a starting material | 91.3 | 1.8 | 6.9 |
| Ex. 14 | continuous addition of alcohol to prim. amine | 89.5 | 4.3 | 6.2 |

Reaction temp: 190° C.,
Catalyst: Cu/Ni/Ru=4/1/0.04 (molar ratio), 0.5% based on the amount of alcohol
Reaction time: 6 hours (the composition of Example 12 is the one after 12 hours)
Molar ratio of primary amine to alcohol=1

It is apparent from the results that a process characterized by continuously adding a primary amine little by little as described in Example 12 tends to give a large amount of a tertiary amine, while a process characterized in that the addition of a primary amine is carried out in such a way that the primary amine is present intthe reaction system in an amount exceeding that consumed by an alcohol or aldehyde per unit time (as described in Examples 11, 13 and 4) enables the selective preparation of a secondary amine.

What is claimed is:

1. A process for preparing a secondary amine, which comprises the steps of reacting an alcohol or an aldehyde with a primary amine in the presence of a catalyst of copper, nickel and a metal element selected from the group consisting of platinum, palladium, ruthenium and rhodium, at a pressure of from atmospheric pressure to 5 kg/cm²G and at a temperature of from 50° to 250° C.; removing water produced in the reaction; and separating the secondary amine from a product mixture.

2. A process for preparing a secondary amine, which comprises the steps of reacting a Guerbet alcohol having 20 carbon atoms with laurylamine in the presence of a ternary catalyst consisting essentially of copper, nickel and ruthenium supported on a synthetic zeolite carrier, the molar ratio of the copper/nickel/ruthenium being 4/1/0.04 respectively; removing water produced in the reaction; and separating the secondary amine from a product mixture.

3. A process as claimed in claim 1, in which said catalyst has a molar ratio of copper to nickel in the range between 1:9 and 9:1 and a molar ratio of the metal element to the total of copper and nickel in the range between 0.001/1 to 0 1/1.

4. A process as claimed in claim 1, in which said primary amine is present during the reaction in an amount exceeding the amount of said primary amine that is consumed by the alcohol or the aldehyde per unit time.

5. The process of claim 2, wherein the ruthenium is replaced by a metal selected from the group consisting of palladium, platinum and rhodium.

6. The process of claim 1, wherein the primary amine is present in an amount larger than the stoichiometric amount.

7. The process of claim 2, wherein the laurylamine is present in an amount larger than the stoichiometric amount.

8. The process of claim 3 in which said primary amine is an aliphatic primary amine having from 4 to 36 carbon atoms, said alcohol is selected from the group consisting of aliphatic alcohols having 8 to 36 carbon atoms and aliphatic glycols having 2 to 12 carbon atoms and said aldehyde is an aliphatic aldehyde having 8 to 36 carbon atoms.

9. The process of claim 3 in which said primary amine is selected from the group consisting of octylamine, laurylamine, oleylamine, stearylamine and behenylamine.

* * * * *

UNITED STATES PATENT AND TRADEMARK OFFICE
CERTIFICATE OF CORRECTION

PATENT NO. : 4,792,622
DATED : December 20, 1988
INVENTOR(S) : Yukinaga YOKOTA et al It is certified that error appears in the above-identified patent and that said Letters Patent is hereby corrected as shown below:

Column 10, line 40; change "0.001/1 to 0 1/1"
to ---0.001/1 to 0.1/1---.

Signed and Sealed this

Twenty-seventh Day of June, 1989

Attest:

DONALD J. QUIGG

Attesting Officer

Commissioner of Patents and Trademarks